United States Patent [19]
Hoffman

[11] 3,827,123
[45] Aug. 6, 1974

[54] TAPE CUTTING AND ATTACHING DEVICE
[76] Inventor: Jacob Hoffman, 670 Waring Rd., Memphis, Tenn. 38122
[22] Filed: Feb. 12, 1973
[21] Appl. No.: 331,966

[52] U.S. Cl. .............................. 29/200 B, 29/208 D
[51] Int. Cl. ...................... B23p 19/00, B23p 19/04
[58] Field of Search....... 29/200 B, 208 D, 558, 557

[56] References Cited
UNITED STATES PATENTS
2,332,445  10/1943  Grim ................................. 29/208 D
3,600,783  8/1971  Krinsky ............................. 29/200 B Primary Examiner—Thomas H. Eager
Attorney, Agent, or Firm—John R. Walker, III

[57] ABSTRACT

A device for cutting circular blanks out of double-sided pressure-sensitive tape and for attaching the blanks to an arbor of a contact lens adjusting, modifying or finishing machine whereby a contact lens may be affixed to the arbor by means of the double-sided pressure-sensitive tape. The device includes a die and a punch for coacting together to cut out the circular blank and includes a means for holding the arbor in a position so that the punch will force the blank into engagement with the arbor.

10 Claims, 3 Drawing Figures

PATENTED AUG 6 1974 3,827,123

TAPE CUTTING AND ATTACHING DEVICE

BACKGROUND OF THE INVENTION

1. Field of the Invention

This invention relates generally to contact lens adjusting, modifying or finishing machines and more specifically to devices for cutting out and attaching double-sided pressure-sensitive tape to the arbors of contact lens adjusting, modifying or finishing machines.

2. Description of the Prior Art

Contact lens edging and finishing machines have been disclosed in the following U.S. Pats.: Kratt No. 3,087,284; Hoffman No. 3,112,581; Herbert et al. No. 3,514,908; and Kilmer et al. No. 3,528,326. In the Herbert et al. reference, the contact lens is adhered to a lens holding device by means of double-sided pressure-sensitive tape. The normal procedure in attaching the contact lens to the lens holding device by means of double-sided pressure-sensitive tape is to manually cut the tape into a circular disc of substantially the same dimension as the arbor or to purchase the tape already cut into the desired size circular disc and then to manually place the disc onto the lens holding device using tweezers or fingers. This procedure is very inaccurate and time-consuming. It is difficult to manually center the disc on the end of the lens-holding device and to attempt to do so would require a great length of time. In addition, contamination of the tape by contact with the fingers would be probable when using this procedure.

SUMMARY OF THE INVENTION

The present invention is directed towards overcoming the problems and disadvantages of cutting out and attaching double-sided pressure-sensitive tape to arbors of contact lens finishing machines. The concept of the present invention is to provide a device that will cut the desired size blank out of double-sided pressure-sensitive tape and at the same time will attach the blank to an arbor of a contact lens adjusting, modifying or finishing machine with both accuracy and speed while eliminating the possibility of contamination of the tape.

The device of the present invention includes die means and punch means coacting together to cut the blanks out of the double-sided pressure-sensitive tape. The punch means is movable from a first position away from the die means to a second position inside the die means. A holding means is included for holding the arbor in such a position so that the punch will force the blank into engagement with the arbor when the punch is moved to the second position.

DESCRIPTION OF THE PREFERRED EMBODIMENT

Figure 1:
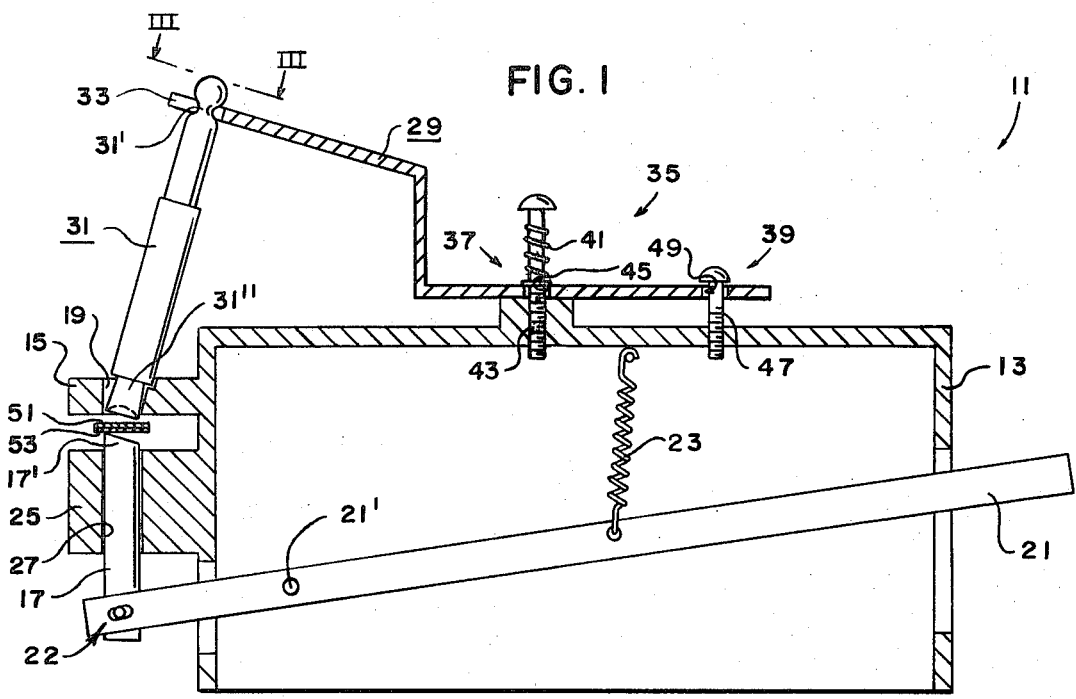
FIG. 1 is a sectional view of the device of the present invention showing the punch means in the first position away from the die means.
Figure 2:
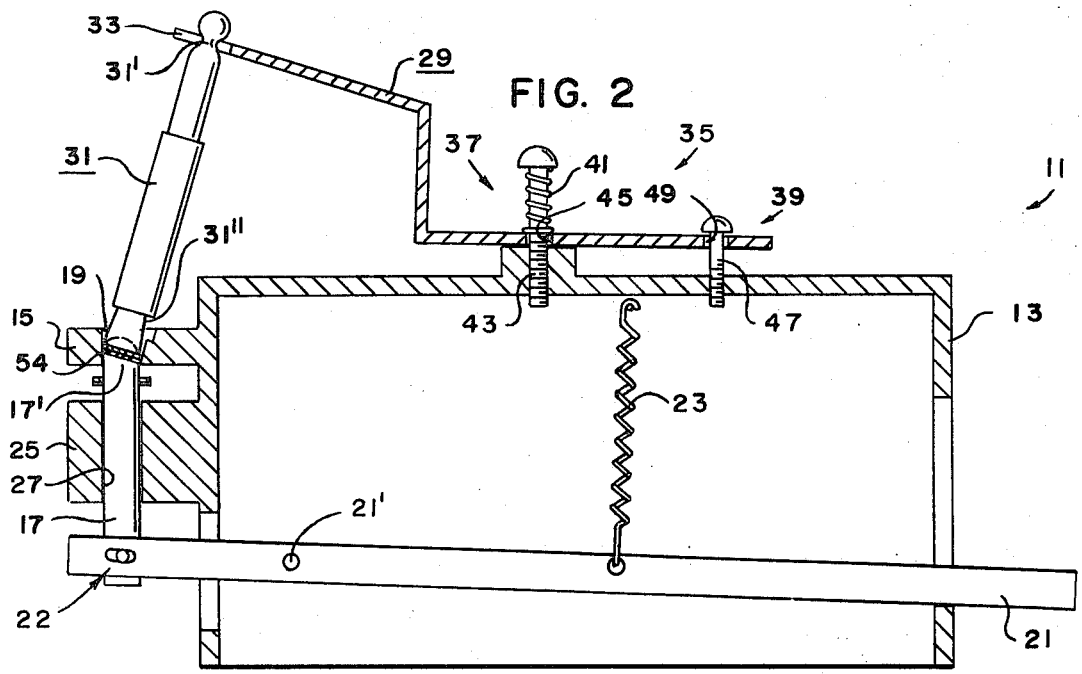
FIG. 2 is a sectional view of the device of the present invention showing the punch means in the second position inside the die means.
Figure 3:
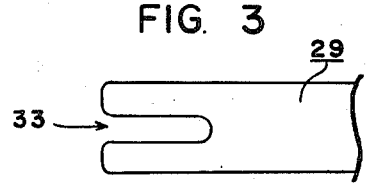
FIG. 3 is a partial view of the holding means of the present invention as taken on Line III—III of FIG. 1 with some parts removed for clarity.

The device 11 of the present invention is for use with contact lens adjusting, modifying or finishing machines, as for example, with the finishing machine disclosed in the Hoffman reference, U.S. Pat. No. 3,112,581. Such contact lens machines serve the general function of adjusting, modifying or finishing contact lens. In general, such machines include an arbor for holding the contact lens and means for rotatably driving the arbor. The present invention is directed towards improvements in attaching the contact lens to the arbor.

The device 11 includes a base 13, a die means 15, and a punch means 17. The die means 15 is attached to the base 13. A die cavity 19 is provided in the die means 15. The punch means 17 is movable from a first position away from the die means 15 to a second position inside the die cavity 19. The die cavity 19 and the punch means 17 have substantially the same cross-sectional area as the blank to be cut out which is preferably circular in shape. The punch means 17 includes a cutting face portion 17' that is preferably at an angle other than 90° relative to the longitudinal axis of the punch means 17. The die cavity 19 is arranged substantially on a longitudinal axis that is at a right angle to the cutting face portion 17' of the punch means 17. A drive means 21 is attached at pivot 21' to the base 13 and at pin and slot 22 to the punch means 17 for moving the punch means 17 between the first and second positions. A spring 23 is attached between the base 13 and the drive means 21 for normally forcing the drive means 21 to hold the punch means 17 in the first position away from the die cavity 19. A punch guide 25 is mounted on the base 13. The punch guide 25 includes a bore 27 in which the punch means 17 is slidably mounted. A holding means 29 is provided on the base 13 to hold an arbor 31 of a contact lens adjusting, modifying or finishing machine adjacent the die cavity 19. The holding means 29 holds the longitudinal axis of the arbor 31 at an angle substantially parallel to the angle of and in line with the longitudinal axis of the die cavity 19. The arbor 31 includes a reduced meck portion 31' and a seat 31''. The holding means 29 includes a slot 33 for receiving the reduced neck portion 31' of the arbor 31 and includes a resilient guide means 35 for allowing limited movement of the holding means 29 from a first, normal position to a second, forced position. The resilient guide means 35 includes a first guide means 37, a second guide means 39, and a spring 41. The first guide means 37 comprises a first rod 43, for example a bolt, attached to the base 13 and a first aperture 45 in the holding means 29. The second guide means 39 comprises a second rod 47, for example a bolt, attached to the base 13 and a second aperture 49 in the holding means 29. The first and second rods 43, 47 pass through the first and second apertures 45, 49 respectively. The spring 41 is positioned on the first rod 43 for urging the holding means 29 to the first, normal position.

In using the device 11 of the present invention, a strip of double-sided pressure-sensitive tape 51, having a paper backing 53 on one side, is positioned adjacent the die cavity 19 with the side having the paper backing 53 directed away from the die means 15 and towards the punch means 17. The arbor 31 is placed in the holding means 29 with the reduced neck 31' of the arbor in the slot 33 and with the seat 31" in the die cavity 19. In this stage, the holding means 29 is held in the first, normal position by the spring 41 of the resilient guide means 35 and the drive means 21 holds the punch means 17 in the first position away from the die cavity 19 by means of the spring 23. Force is then manually applied to the drive means 21 to force the punch means 17 towards the second position inside the die cavity 19 whereby the cutting face 17' of the punch means 17 coacts with the die cavity 19 to cut a blank 54 out of the double-sided pressure-sensitive tape 51. The punch means 17 then forces the blank 54 against the seat 31" of the arbor 31 with enough force to cause the side of the blank 54 without the paper backing to be adhered to the seat 31". To prevent damage to the arbor 31 when the punch means 17 applies force to the arbor 31 through the blank 54, the resilient guide means 35 allows the holding means 29 to move to the second, forced position. The drive means 21 is then released and is moved, along with the punch means 17, back to the first position. The arbor 31 is then removed from the holding means 29 with the blank 54 affixed thereto. The paper backing 53 can then be removed and a contact lens can be placed on the seat 31" of the arbor 31 by any means known to those skilled in the art, for example, by inserting the arbor in a centering device.

It should be pointed out that although this device is shown as an integral part of the machine housing it can also be mounted on a hand punch, not shown, and perform the same operation.

Although the invention has been described and illustrated with respect to a preferred embodiment thereof, it is not to be so limited since changes and modifications may be made therein which are within the full intended scope of the invention.

I claim:

1. A device for cutting blanks out of double-sided pressure-sensitive tape and for attaching the blanks to an arbor of a contact lens adjusting, modifying or finishing machine whereby a contact lens may be affixed to the arbor by means of the double-sided pressure-sensitive tape, said device comprising: die means including a die cavity having substantially the same cross-sectional area as the blank to be cut out, punch means having substantially the same cross-sectional area as said die cavity and being movable from a first position away from said die means to a second position inside said die cavity, drive means attached to said punch means for moving said punch means between the first and second position, and holding means for holding the arbor adjacent said die cavity whereby said punch means is moved into engagement with the arbor when said punch means is moved to the second position.

2. The device of claim 1 in which said holding means includes a slot for receiving the arbor.

3. The device of claim 1 in which said holding means includes resilient guide means for allowing limited movement of said holding means and the arbor from a first, normal position to a second, forced position.

4. The device of claim 3 in which said resilient guide means includes first guide means, second guide means, and a spring on said first guide means urging said holding means to the first, normal position.

5. The device of claim 1 in which said punch means includes a cutting face portion that is at an angle other than 90° relative to the longitudinal axis of said punch means.

6. The device of claim 5 in which said die cavity is arranged substantially on a longitudinal axis that is at a right angle to said face portion of said punch means.

7. The device of claim 6 in which said holding means holds the longitudinal axis of the arbor at an angle substantially parallel to the angle of and in line with the longitudinal axis of said die cavity.

8. The device of claim 1 in which is included spring means attached to said drive means for normally forcing said drive means to hold said punch means in the first position away from said die means.

9. The device of claim 1 in which is included punch guide means for guiding said punch means between the first and second positions while maintaining said punch means in perfect alignment with said die cavity.

10. A device for cutting circular blanks out of double-sided pressure-sensitive tape and for attaching the blanks to an arbor of a contact lens adjusting, modifying or finishing machine whereby a contact lens may be affixed to the arbor by means of the double-sided pressure-sensitive tape, said device comprising: a base; die means attached to said base, said die means including a die cavity having substantially the same cross-sectional area as the blank to be cut out; punch means having substantially the same cross-sectional area as said die cavity and being movable from a first position away from said die means to a second position inside said die cavity; drive means pivotally attached to said base and to said punch means for moving said punch means between the first and second positions; holding means for holding the arbor adjacent said die cavity, said holding means including a slot for receiving the arbor and a resilient guide means for allowing limited movement of said holding means from a first, normal position to a second, forced position; spring means attached between said base and said drive means for normally urging said drive means to hold said punch means in the first position away from said die cavity; and punch guide means mounted on said base for guiding said punch means between the first and second positions while maintaining said punch means in perfect alignment with said die cavity, said punch means being slidably mounted in said punch guide means; said punch means including a cutting face portion that is at an angle other than 90° relative to the longitudinal axis of said punch means, said die cavity being arranged substantially on a longitudinal axis that is at right angles to said face portion of said punch means, and said holding means holding the arbor at an angle substantially parallel to and in line with the longitudinal axis of said die cavity.

* * * * *